Patented May 2, 1933

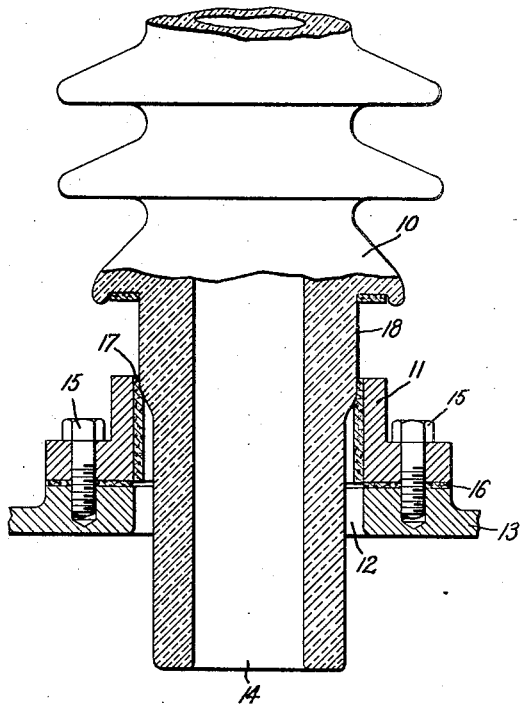
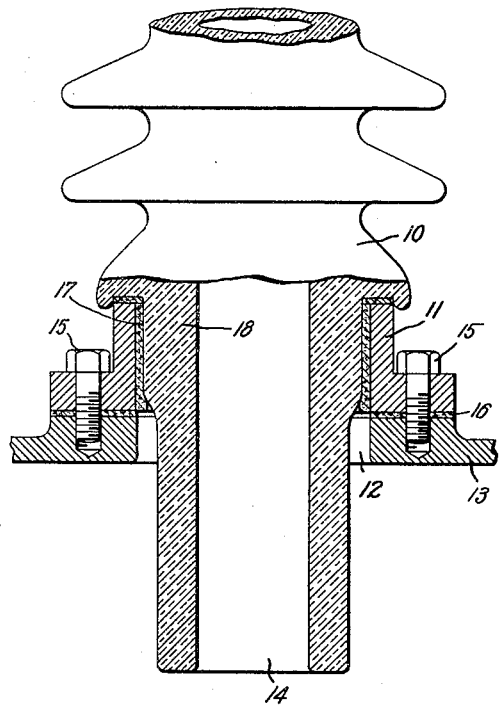
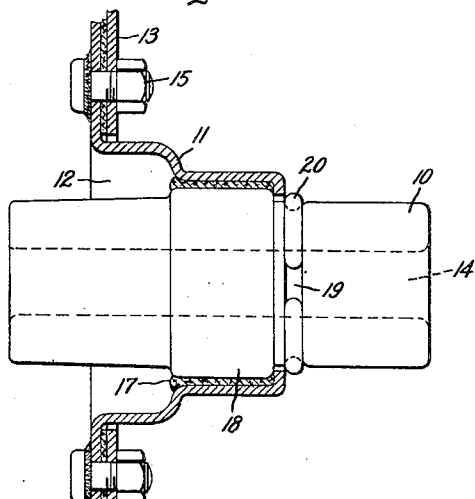
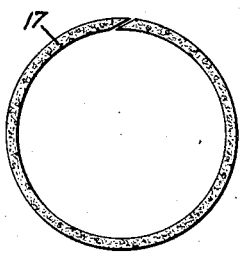

1,906,829

UNITED STATES PATENT OFFICE

HARRY M. ACLY, OF PITTSFIELD, MASSACHUSETTS, ASSIGNOR TO GENERAL ELECTRIC COMPANY, A CORPORATION OF NEW YORK

INSULATING BUSHING

Application filed February 23, 1932. Serial No. 594,547.

My invention relates to insulating bushings and their holders or supports and particularly to a method for assembling a bushing in its support. Where electrical conductors pass through openings as in the walls and covers of transformer casings, the conductors are commonly protected by insulating bushings supported in the openings. The general object of the invention is to provide an improved method for assembling such bushings in place in the openings provided for them.

The invention will be explained in the following description taken in connection with the accompanying drawing in which Fig. 1 is a view, partly in section, of a bushing partly assembled in accordance with the invention in an opening provided for it; Fig. 2 is a view similar to Fig. 1 but with the bushing completely assembled in the opening; Fig. 3 is a view, partly in section, of a different form of bushing assembled in an opening, and Fig. 4 is an end view of a gasket used in assembling a bushing in its opening.

Like reference characters indicate similar parts in the different figures of the drawing.

The bushing 10 shown in Figs. 1 and 2 is formed of insulating material such as porcelain and is supported by a flanged ring 11 in an opening 12 through a metal sheet or plate 13 such as the cover or wall of a transformer casing. The bushing 10 has a longitudinal opening 14 for an electrical conductor to be insulated from the metal sheet 13 and supporting ring 11. The flanged ring 11 is secured by screws 15 to the metal sheet 13 with a gasket 16 in the joint to make the joint tight.

A compressible gasket 17 which may be made of cork is cemented to the inner surface of the flange of the ring 11, the gasket 17 and the inner surface of the flange being preferably cylindrical. The bushing 10 has a section 18 which is somewhat larger in diameter than the initial inner diameter of the gasket 17 so that the thickness of the space between the bushing section 18 and the ring 11 is substantially less than the initial thickness of the gasket 17 before assembly. Therefore, the gasket 17 is compressed when the bushing is assembled in the ring 11 with the gasket in place as shown in Fig. 2.

In assembling the bushing, the inner surface of the gasket 17 or the outer surface of the section 18 of the bushing or both is coated with an adhesive such as shellac which is initially a good lubricant before it has hardened. The bushing is then forced into the gasket, the lubricant permitting the contacting surfaces to slide smoothly together and then hardening or setting to secure the bushing firmly in place in the surrounding gasket and supporting flange with the gasket tightly compressed.

The bushing 10 and its supporting flange 11 shown in Fig. 3 are somewhat different in form from those of Figs. 1 and 2 but the bushing has a corresponding section 18 which is forced into the gasket 17 after one or both of the surfaces have been lubricated by a suitable adhesive. The bushing of Fig. 3 also has a groove 19 in which is a spring ring 20 to hold the bushing in place in case of deterioration or destruction of the gasket 17.

The invention provides a simple, economical and mechanically strong and durable construction in which a simple gasket secures an insulating bushing in place and also effectively seals the joint between the bushing and its support.

The invention has been explained by describing and illustrating certain forms thereof but it will be obvious that changes may be made without departing from the spirit of the invention and the scope of the appended claims.

What I claim as new and desire to secure by Letters Patent of the United States is:

1. The method of assembling an insulating bushing in an opening in a bushing support with a compressed gasket between the outer surface of the bushing and the inner surface of said opening, the thickness of the space between said surfaces being substantially less than the initial thickness of said gasket before assembly, said method including the steps of cementing said gasket to one of said surfaces, coating the other surface of the gasket with a lubricating adhesive, and forcing the bushing into the opening in said support to compress the gasket between them.

2. The method of assembling an insulating bushing having a cylindrical section in a cylindrical opening in a bushing support with a compressed cylindrical gasket between the outer surface of said bushing section and the inner surface of said opening, the thickness of the space between said surfaces being substantially less than the initial thickness of said gasket before assembly, said method including the steps of cementing said gasket to one of said surfaces, coating the other surface of the gasket with a lubricating adhesive, and forcing the cylindrical section of the bushing into the opening in said support to compress the gasket between them.

In witness whereof, I have hereunto set my hand.

HARRY M. ACLY.